Sept. 4, 1923.

J. F. O'CONNOR 1,466,744

FRICTION SHOCK ABSORBING MECHANISM

Filed Nov. 11, 1922   2 Sheets-Sheet 1

Witnesses
Wm. Geiger

Inventor
John F. O'Connor
By Geo. J. Haight
his Atty.

Sept. 4, 1923. 1,466,744
J. F. O'CONNOR
FRICTION SHOCK ABSORBING MECHANISM
Filed Nov. 11, 1922 2 Sheets-Sheet 2
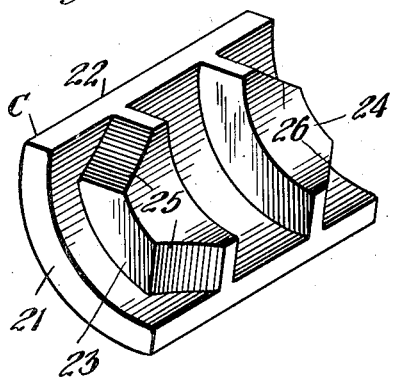
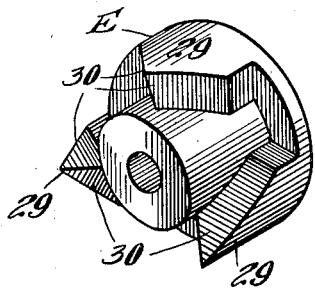
Witnesses
Wm. Geiger
Inventor
John F. O'Connor
By Geo. J. Haight Atty.

Patented Sept. 4, 1923.

1,466,744

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed November 11, 1922. Serial No. 600,227.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings wherein is obtained a graduated friction action by means of radially and circumferentially acting spreading surfaces with a keen angle effect in compression and blunt angle effect in release.

Other objects of the invention will more clearly appear from the description and claims hereinafter following.

Figure 1:
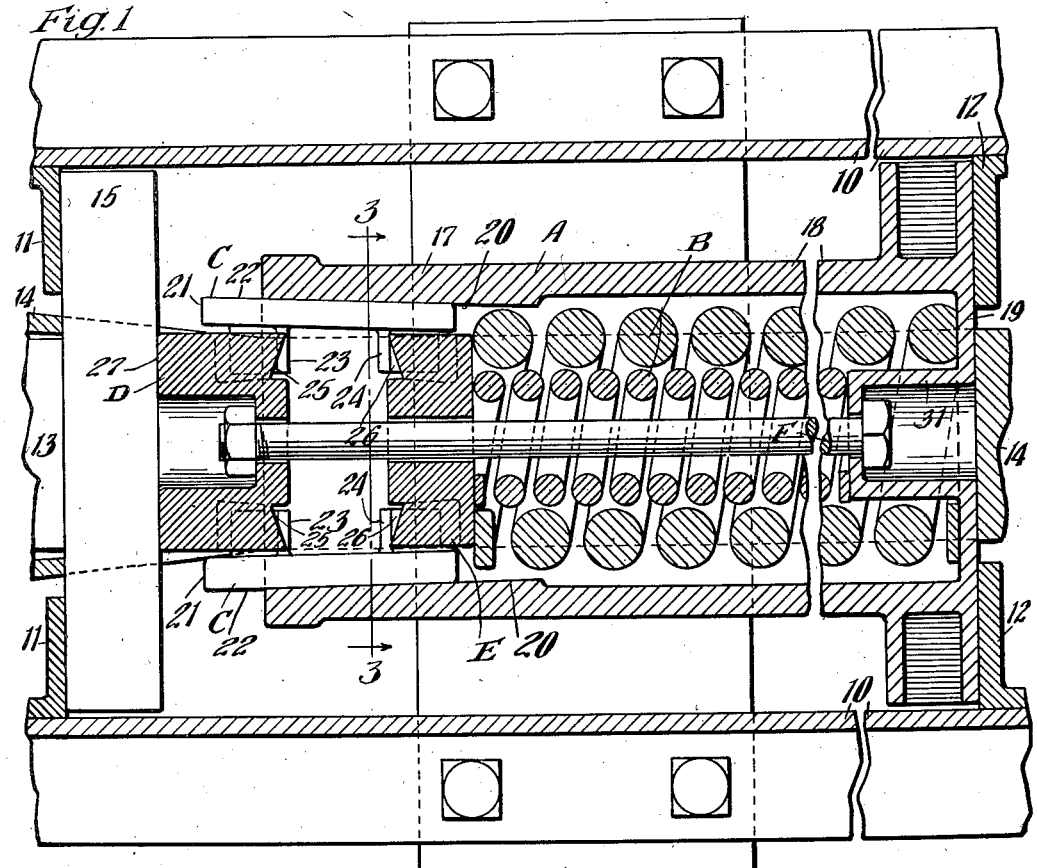
Figure 2:
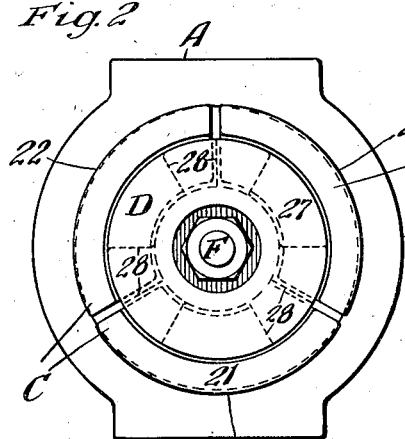
Figure 3:
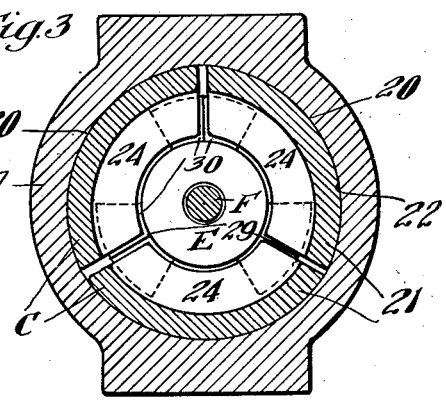

In the drawings forming a part of this specification, Figure 1 is a longitudinal sectional view of a portion of a railway draft rigging showing my improvements in connection therewith, the section through the friction elements being on planes intersecting each other at 120° and the balance of the figure being a horizontal section. Figure 2 is a front end elevation of the shock absorbing mechanism proper. Figure 3 is a vertical transverse sectional view of the shock absorbing mechanism proper corresponding to the section line 3—3 of Figure 1. And Figures 4 and 5 are detail perspectives of one of the friction shoes and one of the wedging elements, respectively.

In said drawings, 10—10 denote channel draft sills of a car underframe, to the inner faces of which are secured front stop lugs 11 and rear stop lugs 12. A portion of a drawbar is indicated at 13, the same being operatively associated with a hooded cast yoke 14 within which is included the shock absorbing mechanism proper and a front follower 15. The yoke and parts therewithin are supported in operative position by a detachable saddle plate 16.

The improved shock absorbing mechanism proper, as shown, comprises a combined friction shell and spring cage casting A; a spring resistance B; three friction shoes C—C arranged in a circular series; an outer pressure-receiving and transmitting wedge D; an inner wedge E; and a retainer bolt F.

The casting A, as shown, is of cylindrical form, having a friction shell proper 17 formed at the outer end thereof and a spring casing or cage 18 rearwardly of the shell proper. The casting A is provided with an integral rear vertical wall 19 which is laterally extended and suitably reinforced so as to adapt it to function as a rear follower in conjunction with the stop lugs 12. The shell proper 17 is provided on the interior thereof with three friction surfaces 20, each of which constitutes a portion of a true cylindrical surface, said friction surfaces 20 being converged inwardly of the shell.

The three friction shoes C are of like construction and each comprises a main section 21 constituting a portion of an annulus, the same having an outer true cylindrical friction surface 22 cooperable with one of the corresponding shell friction surfaces 20. On its inner side, each shoe C is formed with two oppositely arranged radially extending enlargements 23 and 24. The enlargement 23 is formed with two oppositely disposed wedge faces 25—25 which extend radially of the shell and which are converged inwardly of the shell. By reason of providing the true cylindrical surfaces 20 on the shell and tapering them, it will be obvious that I insure full surface contact between the shoe and the respective friction shell surface at all times, during the movement of the shoes.

The outer wedge D is in the form of a block having an outer flat face 27 which bears upon the front follower 15. Said wedge D is further provided with three wedge sections, disposed 120° apart circumferentially, as shown in Figure 2, each of said wedge sections having a pair of opposed wedge faces 28—28, which extend radially of the shell and which are converged inwardly of the shell. Said wedge faces 28—28 are adapted to co-act with two wedge faces 25 of two shoes. That is, each wedge section of the wedge D will cooperate with two shoes C near the adjacent radial edges of said shoes.

The inner wedge E is constructed similarly to the front wedge D, said wedge E having three wedge sections 29, disposed 120° apart circumferentially, each wedge section having a pair of diverging wedge faces 30—30, extending radially of the shell and diverging inwardly of the shell. Said wedge faces 30—30 co-act with the corresponding wedge faces 26 at the inner ends of the friction shoes C. As will be clearly seen from an inspection of Figure 1, clearance is left radially between the wedges D and the main sections 21 of the shoes C to allow for the lateral approach of the shoes C, as the latter are forced inwardly of the tapered friction shell.

The spring B bears at its front end against the wedge F and at its rear end is seated upon portions of the casting A, so as to thereby afford a yielding resistance to relative movement between the shoes and the shell.

The retainer bolt F is anchored at its inner end within a hollow boss 31, formed integral with the casting A and at its front end is anchored within a suitable socket provided in the wedge D, the wedge D and wedge E being both suitably apertured to accommodate the shank of the bolt.

The operation is as follows, assuming a compression stroke under buff. As the pressure is applied to the wedge D, forcing the latter inwardly of the shell, the three sets of wedge faces 28 co-acting with the shoe wedge faces 25, tend to separate the shoes radially and hence set up the necessary pressure between the shoes and the friction shell. A similar action will take place between the wedge E and the shoes at the inner ends of the latter. In addition to the foregoing, as the shoes are forced longitudinally within the shell, they are compelled to approach each other radially, due to the taper of the shell and consequently additional resistance will be afforded against this action by reason of the wedge-shaped enlargements of the shoes, traveling radially inward with respect to the two wedge elements D and E. In this manner, high capacity is created, the capacity being gradually increased as the friction unit is forced inwardly of the shell. In release, due to the outward flaring of the shell and the blunt angle arrangement of all of the cooperating sets of wedge faces, the parts may be readily projected outwardly. While the cooperating sets of wedge faces 28 and 25, and 30 and 26 extend at relatively blunt angles with respect to radial planes passing through the axis of the mechanism, nevertheless the effect of said wedging faces is that of keen angle wedges, due to the radial arrangement of said faces combined with the taper of the shell which produces the differential action above mentioned. In release, however, the effect is that of blunt angles, inasmuch as the wedge D is free to fall away from or collapse with respect to the outer ends of the shoes and similarly, after such action, the shoes may readily fall away from or collapse with respect to the sets of wedging faces on the inner wedge member E.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction member having friction surfaces extending at a slight angle with respect to the axis of the mechanism; of spring resisting means; a plurality of friction shoes operative upon and co-acting with said friction surfaces, each shoe having front and rear, oppositely arranged wedge sections, each section having diverging wedge faces extending substantially radially with respect to the axis of the mechanism; and front and rear wedge members, each having a plurality of sets of wedge faces cooperable with the respective sets of front and rear wedge sections on the shoes.

2. In a friction shock absorbing mechanism, the combination with a friction shell having interior inwardly converged friction surfaces; of spring resisting means; a plurality of friction shoes cooperable with said shell friction surfaces, each shoe having front and rear, oppositely arranged wedge sections, each section having diverging wedge faces extending substantially radially with respect to the axis of the shell; and front and rear wedge members each having a plurality of sets of wedge faces cooperable with the respective sets of front and rear wedge sections on the shoes.

3. In a friction shock absorbing mechanism, the combination with a friction shell having interior cylindrical friction surfaces converging inwardly of the shell; of a spring resistance; a plurality of friction shoes, each having an outer cylindric friction surface and provided on its inner side with front and rear wedge sections, the front wedge section having radially extending inwardly diverging wedge faces and the rear section having radially extending outwardly diverging wedge faces; and front and rear wedge members having correspondingly arranged wedge faces cooperable with the wedge faces on the outer and inner wedge sections, respectively, of the shoes.

4. In a friction shock absorbing mechanism, the combination with a friction shell having interior inwardly converged friction surfaces; of a spring resistance; a plurality of friction shoes, each shoe having an outer friction surface cooperable with the shell friction surface and provided on its inner side with a front set of inwardly diverging wedge faces and a rear set of outwardly diverging wedge faces; and outer and inner wedge members, each of said wedge members having diverging sets of wedge faces corresponding to and cooperable with the wedge faces of the shoes, each set of wedge faces on a wedge member being arranged opposite the adjacent edges of two friction shoes.

In witness that I claim the foregoing I have hereunto subscribed my name this 7th day of October, 1922.

JOHN F. O'CONNOR.

Witnesses:
 UNA C. GRIGSBY,
 ANN BAKER.